(12) United States Patent
Mady et al.

(10) Patent No.: US 10,544,956 B2
(45) Date of Patent: Jan. 28, 2020

(54) HVAC SYSTEM START/STOP CONTROL

(71) Applicant: Carrier Corporation, Farmington, CT (US)

(72) Inventors: Alie El-Din Mady, Cork (IE); Konstantinos Kouramas, Cork (IE); Marcin T. Cychowski, Cork (IE); Lionel Andreas Hertig, Cork (IE)

(73) Assignee: CARRIER CORPORATION, Palm Beach Gardens, FL (US)

( * ) Notice: Subject to any disclaimer, the term of this patent is extended or adjusted under 35 U.S.C. 154(b) by 27 days.

(21) Appl. No.: 15/579,444

(22) PCT Filed: Jun. 8, 2016

(86) PCT No.: PCT/US2016/036300
§ 371 (c)(1),
(2) Date: Dec. 4, 2017

(87) PCT Pub. No.: WO2016/200855
PCT Pub. Date: Dec. 15, 2016

(65) Prior Publication Data
US 2018/0142915 A1     May 24, 2018

Related U.S. Application Data

(60) Provisional application No. 62/172,332, filed on Jun. 8, 2015.

(51) Int. Cl.
| | |
|---|---|
| F24F 11/00 | (2018.01) |
| F24F 11/64 | (2018.01) |
| F24F 11/61 | (2018.01) |
| F24F 11/63 | (2018.01) |
| F24F 11/46 | (2018.01) |

(Continued)

(52) U.S. Cl.
CPC ............ *F24F 11/64* (2018.01); *F24F 11/46* (2018.01); *F24F 11/56* (2018.01); *F24F 11/61* (2018.01);

(Continued)

(58) Field of Classification Search
CPC .. F24F 11/46; F24F 11/56; F24F 11/61; F24F 11/63; F24F 11/64; F24F 11/65;
(Continued)

(56) References Cited

U.S. PATENT DOCUMENTS

| 4,475,685 A | 10/1984 | Grimado et al. |
|---|---|---|
| 7,024,283 B2 | 4/2006 | Bicknell |

(Continued)

FOREIGN PATENT DOCUMENTS

| DE | 19831127 A1 | 3/2001 |
|---|---|---|
| EP | 1866575 B1 | 1/2011 |

(Continued)

OTHER PUBLICATIONS

International Search Report and Written Opinion for application PCT/US2016/036300, dated Sep. 7, 2016, 10 pages.

*Primary Examiner* — Mark A Connolly
(74) *Attorney, Agent, or Firm* — Cantor Colburn LLP

(57) ABSTRACT

A control system for an HVAC system having at least one HVAC component, the control system comprising: a controller having a processor and a memory, the controller in signal communication with the at least one HVAC component, the controller configured to: determine a startup/shutdown setpoint and the time associated with a beginning or an end of a building occupancy period; determine a predicted weather condition for outside air at a location of the HVAC system; predict a set of indoor air conditions over the period from the current time until the building being occupied/unoccupied based on the determined setpoint and time and the predicted weather condition; and start/stop the at least one HVAC component when an actual room air condition approaches the predicted indoor air condition.

19 Claims, 3 Drawing Sheets

(51) Int. Cl.
*F24F 11/65* (2018.01)
*F24F 11/56* (2018.01)
*G05B 15/02* (2006.01)
*F24F 11/30* (2018.01)
*F24F 110/00* (2018.01)
*F24F 110/10* (2018.01)
*F24F 110/20* (2018.01)
*F24F 110/70* (2018.01)
*F24F 130/00* (2018.01)
*F24F 130/10* (2018.01)
*F24F 120/12* (2018.01)
*F24F 110/12* (2018.01)

(52) U.S. Cl.
CPC .............. *F24F 11/63* (2018.01); *F24F 11/65* (2018.01); *G05B 15/02* (2013.01); *F24F 11/30* (2018.01); *F24F 2110/00* (2018.01); *F24F 2110/10* (2018.01); *F24F 2110/12* (2018.01); *F24F 2110/20* (2018.01); *F24F 2110/70* (2018.01); *F24F 2120/12* (2018.01); *F24F 2130/00* (2018.01); *F24F 2130/10* (2018.01)

(58) Field of Classification Search
CPC ............... F24F 2120/10; F24F 2120/12; F24F 2120/20; G05D 23/1904
See application file for complete search history.

(56) References Cited

U.S. PATENT DOCUMENTS

| | | | |
|---|---|---|---|
| 8,560,126 | B2 | 10/2013 | Vass et al. |
| 8,606,374 | B2 | 12/2013 | Fadell et al. |
| 10,180,261 | B1 * | 1/2019 | Ross ................. F24F 11/30 |
| 2003/0207665 | A1 | 11/2003 | Liu |
| 2010/0262298 | A1 | 10/2010 | Johnson et al. |
| 2010/0262299 | A1 | 10/2010 | Cheung et al. |
| 2011/0251726 | A1 * | 10/2011 | McNulty ............ G05B 13/0265 700/278 |
| 2011/0264278 | A1 | 10/2011 | Gilbert et al. |
| 2012/0065783 | A1 | 3/2012 | Fadell et al. |
| 2013/0190940 | A1 | 7/2013 | Sloop et al. |
| 2014/0222219 | A1 | 8/2014 | Wen |
| 2014/0358291 | A1 | 12/2014 | Wells |
| 2014/0365017 | A1 * | 12/2014 | Hanna ................. F24F 11/30 700/276 |

FOREIGN PATENT DOCUMENTS

| | | |
|---|---|---|
| WO | 2011149600 A2 | 12/2011 |
| WO | 2013142105 A1 | 9/2013 |
| WO | 2015013677 A2 | 1/2015 |
| WO | 2015014229 A1 | 2/2015 |

* cited by examiner

US 10,544,956 B2

HVAC SYSTEM START/STOP CONTROL

TECHNICAL FIELD

The subject matter disclosed herein relates to HVAC systems and, more specifically, to control of HVAC system equipment.

BACKGROUND

Existing start/stop strategies for heating, ventilation, and air conditioning (HVAC) systems are based on fixed start/stop schedules, gradient methods, and unoccupied setpoint adjustment methods. These strategies estimate the start/stop times for an HVAC system required to meet comfort conditions at the beginning and end of daily building occupancy. The gradient method predicts the required start time for the HVAC system based on a single linear approximation of the indoor temperature, at the beginning or end of the occupancy period. An example of the gradient method is described in U.S. Pat. Nos. 4,660,759 and 4,106,690. The setpoint adjustment method regularly updates the unoccupied setpoints of the HVAC system to reach the required comfort setpoint at the beginning or end of the occupancy period. An example of the setpoint method is described in U.S. Pat. No. 1,463,988. However, these methods do not take into account zone and outdoor air temperatures forecasting or HVAC equipment efficiency, which may result in comfort violations and increase energy usage.

Accordingly, it is desirable to provide a control system to improve HVAC system efficiency and maintain building comfort levels.

BRIEF DESCRIPTION

In one embodiment, a control system for an HVAC system having at least one HVAC component is disclosed. The control system comprises a controller having a processor and a memory, the controller in signal communication with the at least one HVAC component, the controller configured to: determine a first setpoint and a first time associated with a beginning of a building occupancy period; determine a predicted weather condition for outside air at a location of the HVAC system; predict a first indoor air condition based on the determined first setpoint and time and the predicted weather condition; and start the at least one HVAC component when an actual room air condition approaches the first predicted indoor air condition.

In addition to one or more of the features described above, or as an alternative, further embodiments may include configurations wherein the first setpoint is one or more condition of air supplied to a zone.

In addition to one or more of the features described above, or as an alternative, further embodiments may include configurations wherein the one or more condition includes at least one of a temperature, a humidity, and a $CO_2$ level of the air supplied to the zone.

In addition to one or more of the features described above, or as an alternative, further embodiments may include configurations wherein the one or more condition includes a temperature, a humidity, and a $CO_2$ level of the air supplied to the zone.

In addition to one or more of the features described above, or as an alternative, further embodiments may include configurations wherein the controller is further configured to: determine a second setpoint and a second time associated with an end of the building occupancy period; predict a second indoor air condition based on the determined second setpoint and time and the predicted weather condition; and shutdown the at least one HVAC component when the actual room air condition approaches the predicted second indoor air condition.

In addition to one or more of the features described above, or as an alternative, further embodiments may include configurations wherein the at least one HVAC component is a capacity generation plant, an air handling unit, and at least one terminal unit.

In another embodiment, an HVAC system comprises at least one HVAC component and a controller in signal communication with the at least one HVAC component. The controller includes a processor and a memory and is configured to determine a first setpoint and a first time associated with a beginning of a building occupancy period; determine a predicted weather condition for outside air at a location of the HVAC system; predict a first indoor air condition based on the determined first setpoint and time and the predicted weather condition; and start the at least one HVAC component when an actual room air condition approaches the first predicted indoor air condition.

In addition to one or more of the features described above, or as an alternative, further embodiments may include configurations wherein the controller is configured to update the operational setpoints at predetermined time intervals.

In addition to one or more of the features described above, or as an alternative, further embodiments may include configurations wherein the first setpoint is one or more condition of air supplied to a zone.

In addition to one or more of the features described above, or as an alternative, further embodiments may include configurations wherein the one or more condition includes at least one of a temperature, a humidity, and a $CO_2$ level of the air supplied to the zone.

In addition to one or more of the features described above, or as an alternative, further embodiments may include configurations wherein the one or more condition includes a temperature, a humidity, and a $CO_2$ level of the air supplied to the zone.

In addition to one or more of the features described above, or as an alternative, further embodiments may include configurations wherein the controller is further configured to determine a second setpoint and a second time associated with an end of the building occupancy period; predict a second indoor air condition based on the determined second setpoint and time and the predicted weather condition; and shutdown the at least one HVAC component when the actual room air condition approaches the predicted second indoor air condition.

In addition to one or more of the features described above, or as an alternative, further embodiments may include configurations wherein the at least one HVAC component is a capacity generation plant, an air handling unit, and at least one terminal unit.

In another embodiment, a method of controlling an HVAC system having at least one HVAC component is disclosed. A controller is in signal communication with the at least one HVAC component. The method comprises determining a first setpoint and a first time associated with a beginning of a building occupancy period; determining a predicted weather condition for outside air at a location of the HVAC system; predicting a first indoor air condition based on the determined first setpoint and time and the predicted weather condition; and starting the at least one HVAC component when an actual room air condition approaches the first predicted indoor air condition.

In addition to one or more of the features described above, or as an alternative, further embodiments may include configurations wherein the first setpoint is one or more condition of air supplied to a zone.

In addition to one or more of the features described above, or as an alternative, further embodiments may include configurations wherein the one or more condition includes at least one of a temperature, a humidity, and a CO2 level of the air supplied to the zone.

In addition to one or more of the features described above, or as an alternative, further embodiments may include configurations wherein the one or more condition includes a temperature, a humidity, and a CO2 level of the air supplied to the zone.

In addition to one or more of the features described above, or as an alternative, the method may further include determining a second setpoint and a second time associated with an end of the building occupancy period; predicting a second indoor air condition based on the determined second setpoint and time and the predicted weather condition; and shutting down the at least one HVAC component when the actual room air condition approaches the predicted second indoor air condition.

In addition to one or more of the features described above, or as an alternative, further embodiments may include configurations wherein the at least one HVAC component is a capacity generation plant, an air handling unit, and at least one terminal unit.

BRIEF DESCRIPTION OF THE DRAWINGS

The foregoing and other features, and advantages of embodiments are apparent from the following detailed description taken in conjunction with the accompanying drawings in which.

DETAILED DESCRIPTION

Figure 1:
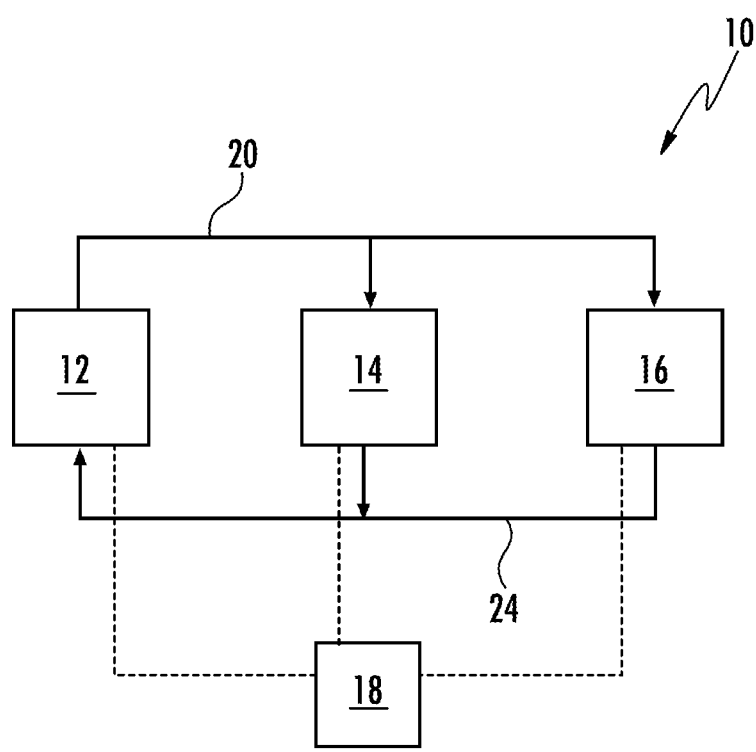
FIG. 1 is a schematic view of an exemplary HVAC system.

FIG. 1 illustrates an exemplary HVAC system 10 that generally includes HVAC equipment such as a capacity generation plant 12, an air handling unit (AHU) 14, one or more terminal units 16, and a controller 18. Capacity generation plant 12 conditions (i.e., heats/cools) a heat transfer fluid such as water and supplies the conditioned fluid to AHU 14 and terminal units 16 via a supply conduit 20. The conditioned fluid is utilized to condition air forced through AHU 14 and terminal units 16. The conditioned air is then used to adjust the temperature of a building or structure associated with HVAC system 10. The fluid is returned to capacity generation plant 12 via a return conduit 24 where the fluid is re-conditioned. Controller 18 is configured to predict and implement a start/stop time of HVAC system equipment (e.g., capacity generation plant 12, AHU 14, and terminal units 16) to meet a desired comfort at the beginning and end of daily building occupancy, which reduces energy consumption and improves system efficiency.

Capacity generation plant 12 may be, for example a heat pump, a chiller, or a boiler. However, capacity generation plant 12 may be any type of capacity generation plant that enables HVAC system 10 to function as described herein. Capacity generation plant 12 is configured to heat or cool a heat transfer fluid (e.g., water) to facilitate environmental conditioning of the building. As such, capacity generation plant 12 may be controlled to selectively adjust the temperature of the heat transfer fluid.

AHU 14 is configured to receive outside air and supply the outside air to the one or more terminal units 16, which condition the air and supply it to the zone(s) or area(s) associated with the respective terminal unit(s) 16. The conditioned air is subsequently returned to AHU 14 where it may be recycled or exhausted to the atmosphere. In the illustrated embodiment, terminal units 16 are fan coil units. However, terminal units 16 may be any suitable equipment that enables HVAC system 10 to function as described herein. For example, terminal units 16 may be fan coil units (FCUs), air terminal units (ATUs), variable air volume systems (VAV), or even AHUs.

Controller 18 may be a system-level controller configured to adjust the start/stop operation of the HVAC equipment, such as capacity generation plant 12, AHU 14, and terminal units 16, based on predicted environmental conditions and predetermined building comfort property setpoints, as is described herein in more detail. As used herein, the term controller refers to an application specific integrated circuit (ASIC), an electronic circuit, a processor (shared, dedicated, or group) and memory that executes one or more software or firmware programs, a combinational logic circuit, and/or other suitable components that provide the described functionality.

In the exemplary embodiment, controller 18 is in signal communication with the HVAC equipment whose start/stop operation will be controlled. In the illustrated embodiment, controller 18 is in signal communication with capacity generation plant 12, AHU 14, and terminal unit 16. In the exemplary embodiment, each day the HVAC equipment may be started to provide thermal conditioning of the building before or when occupants arrive. The HVAC equipment may then be shut down before or when the occupants leave the building and the thermal conditioning is not required. As such, controller 18 controls the start/stop time of the HVAC equipment to respect user comfort during occupied time, while conserving energy and increasing system efficiency. In the exemplary embodiment, controller 18 controls the start/stop time of equipment 12, 14, 16 based on a first input (Input 1), a second input (Input 2) and a third input (Input 3).

Input 1 is a predetermined setpoint (i.e., condition) to be reached in one or more zones of the building at a predetermined time. The predetermined setpoint may include a predetermined temperature, humidity, and/or CO2 level of the air supplied to the zones. The predetermined setpoint represents the building comfort condition. The predetermined setpoint may be evaluated based on a single zone setpoint as a reference zone (that represents the whole building condition) or using fusion method for many zone setpoints (for example, average or weighted average based on each zone area). For example, Input 1 may be a predetermined setpoint room temperature of 72° F. at 8:00 a.m. and a room temperature of 70° F. at 6:00 p.m. The predetermined setpoint may be input into controller 18 by an authorized user or by building management system (BMS).

Input 2 is a predicted weather forecast of the outside air that the building will utilize to condition the zones. For example, the predicted weather conditions may be the predicted weather conditions at the building's location for the following day. The predicted weather conditions may include a predicted temperature, humidity, and/or CO2 level of the air at that building location.

Input 3 is a measured comfort condition. The comfort condition may include one or more of temperature, humidity, and/or CO2 level for one or many zones. The measured comfort condition represents the current building comfort condition. Similar to Input 1, measured comfort condition may be measured for a single zone as a reference zone (that represents the whole building condition) or based on fusion method for many zone conditions (for example, average or weighted average based on each zone area). The measured comfort condition may be input into controller 18 by each FCU sensors or by building management system (BMS).

Figure 2:
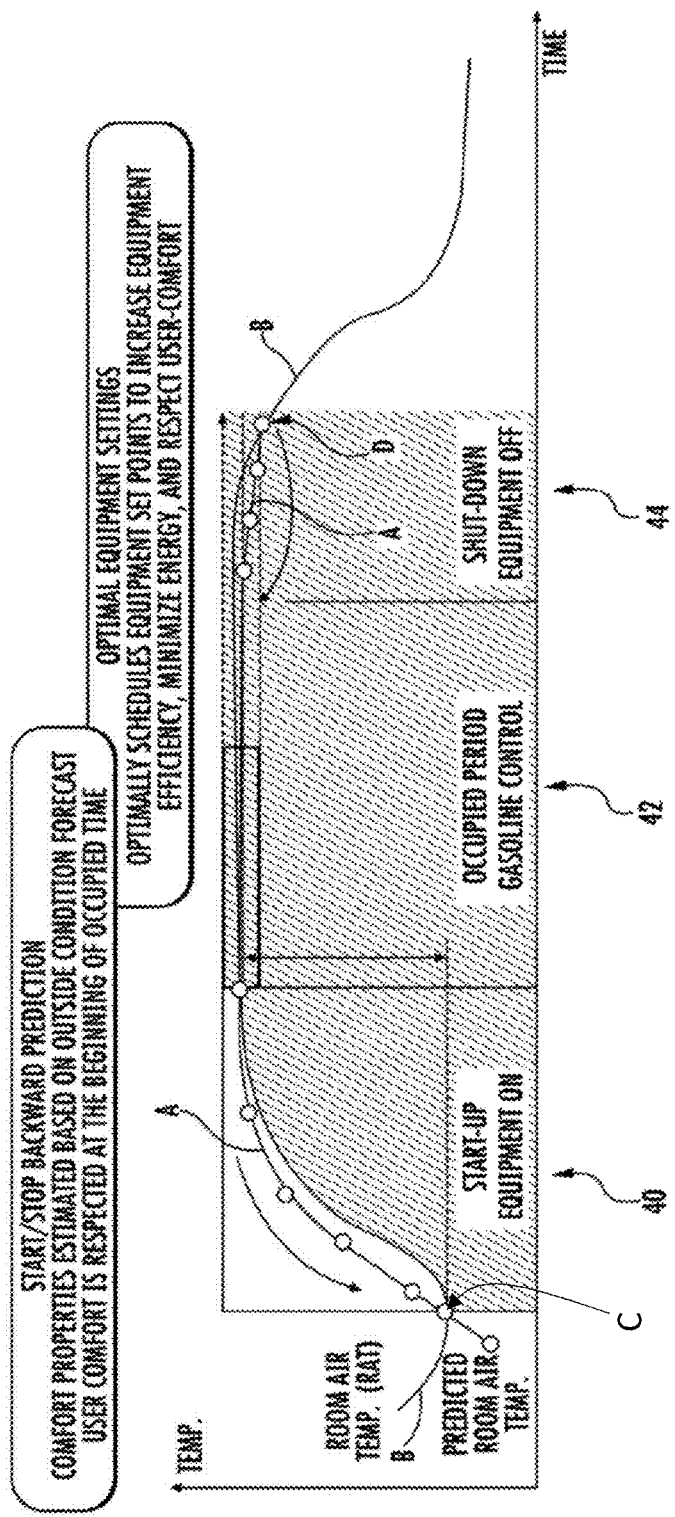
FIG. 2 is a schematic illustration of an exemplary operation of the system shown in FIG. 1.

FIG. 2 illustrates a graphical representation of the building temperature over time. The graph illustrates a startup period 40 of the HVAC equipment, an occupied period 42 when the building is generally occupied, and a shutdown period 44 of the HVAC equipment.

Controller 18 subsequently predicts the indoor air temperature, humidity, and/or CO2 in the zones based on successive linear approximations of the temperature, humidity, and/or CO2 (Input 1) and the predicted weather conditions (Input 2). The successive linear approximations are illustrated by Line A in FIG. 2. Controller 18 monitors the actual room air conditions in the zones (Input 3), and the HVAC equipment 12, 14, 16 is started or shut down when the actual indoor temperature, humidity, and/or CO2 measurements (Line B) reach or approach the predicted conditions (Line A). For example, the HVAC equipment is started at Point C, where the actual measurement (Line B) approaches the predicted conditions (Line A). Similarly, the HVAC equipment is shut down at Point D, where the actual measurement (Line B) approaches the predicted conditions (Line A).

Controller 18 uses backward prediction model for the indoor condition. The backward prediction model may use predetermined setpoint target for the occupied or unoccupied time as the starting point of the prediction and the weather forecast for a day prior to the occupied or unoccupied time. The predicted indoor condition may be calculated for one or many backward step(s), for example each step may be for 15 mins (Line A). The predicted condition of one step (i.e., prediction model output) may be the input of the next step. Backward prediction model uses one or more parameter(s) that represent the building envelop and HVAC equipment characteristics.

Controller 18 schedules the HVAC equipment 12, 14, 16 operation settings, for example water flow, supplied water and supplied air setpoints, during the startup and shutdown periods to increase the equipment efficiency and minimize energy usage while meeting a predefined user comfort. The scheduling of the equipment settings uses a model (e.g., a model for improving efficiency). The model uses the predicted indoor condition and the predetermined setpoint as input, and then it determines the operation settings for one or more period(s) over the period from startup to occupied time or from shutdown to unoccupied time.

Figure 3:
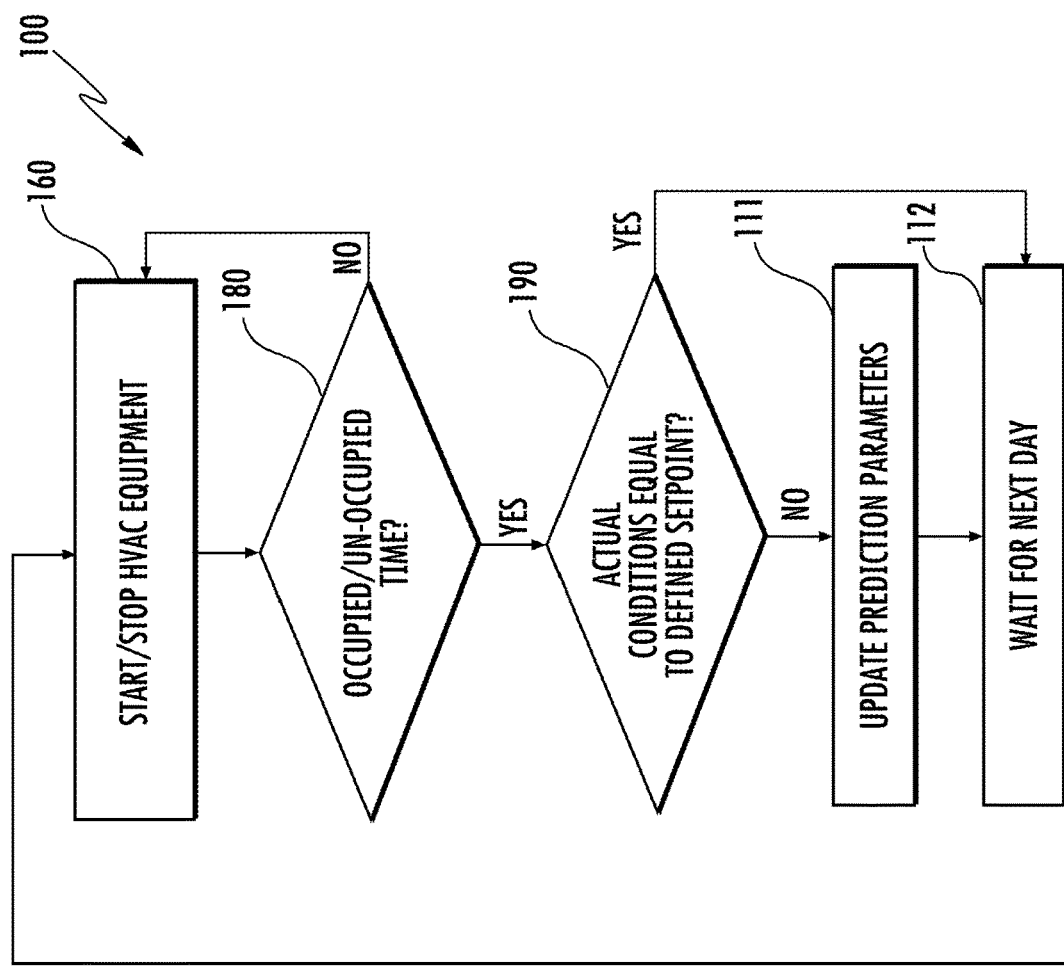
FIG. 3 is a flow chart illustrating an exemplary method of controlling the system shown in FIG. 1.
Figure 3:
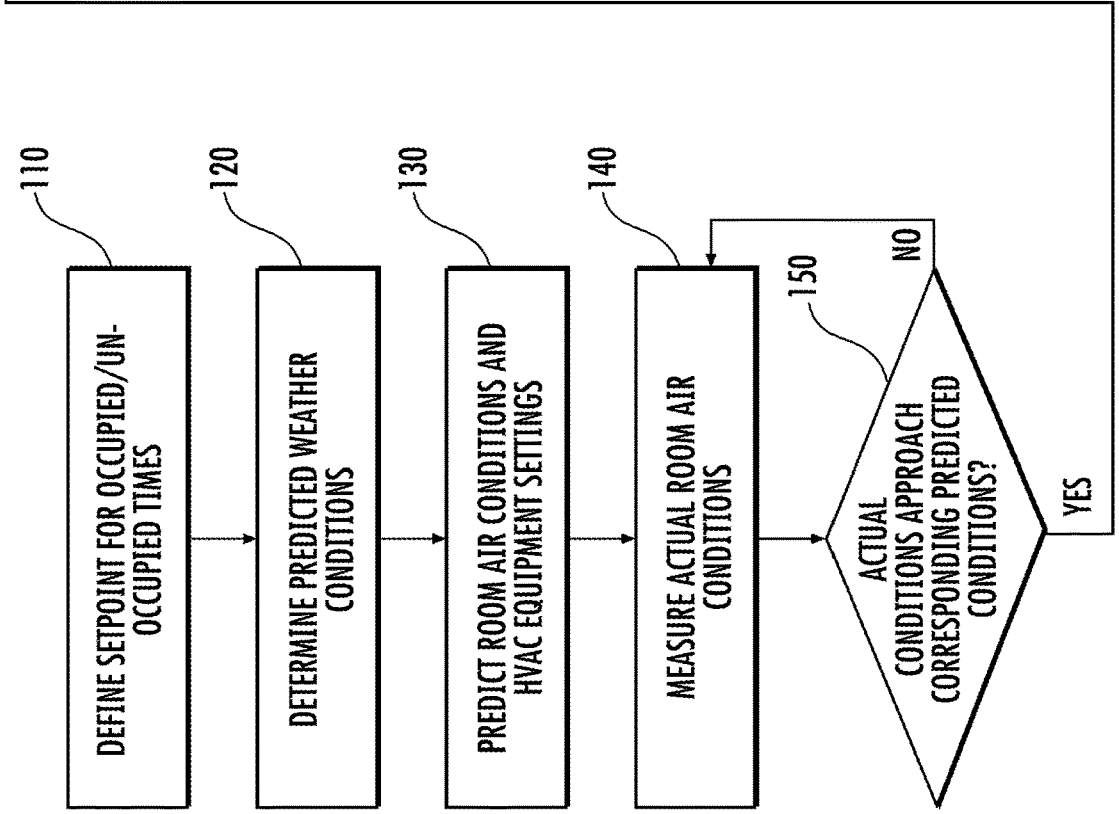

FIG. 3 illustrates an exemplary method 100 of controlling HVAC system 10 that begins at step 110, where controller 18 receives or determines setpoints and associated times for the zones (Input 1). At step 120, controller 18 receives or determines the predicted weather conditions (Input 2) such as for the following day.

At step 130, controller 18 predicts successive linear approximations of the room air conditions over time and the corresponding HVAC equipment settings based on Input 1 and Input 2. Controller 18 uses a backward prediction model to predict the indoor condition at the previous prediction step based the current indoor condition, the current forecasting weather condition and the building and HVAC equipment parameters. At the beginning, the controller 18 assumes that the current indoor condition is the zone setpoint and weather forecast at the beginning or end of occupied time. Then, controller 18 predicts what would be the indoor condition one step backward for example at the previous 15 min. The predicted indoor condition from this step will be used as the current indoor condition with the associated weather forecasting to predict the other previous step, and so on. Based on the difference between the targeted setpoint and the predicted indoor condition, the HVAC equipment setting is updated in the prediction model to maintain maximum equipment efficiency. At step 140, controller 18 monitors or measures the actual room air conditions in the zones (Input 3).

At step 150, controller 18 determines to execute step 160 if the actual conditions approach the predicted condition, otherwise execute step 140. At step 160, controller 18 starts or stops one or more or all of the HVAC equipment 12, 14, 16 when the actual room air conditions reach the predicted linear approximations (prior to building occupancy/unoccupied). At step 180, controller 18 determines to execute step 190 if the occupied/un-occupied time is reached, otherwise execute step 160. At step 190, controller 18 determines to execute step 111 if actual condition at occupied/unoccupied time is not matched to the predicted conditions, otherwise controller 18 remains the prediction parameters for the next day at step 112. At step 111, controller 18 tunes the building and HVAC equipment parameters based on the difference between the targeted setpoint the actual indoor conditions.

Described herein are systems and methods for controlling HVAC system equipment such as a capacity generation plant, an AHU, and a terminal unit. The controller predicts start and stop times of the HVAC equipment based on a predetermined setpoint for a predetermined time, and predicted weather conditions for outside air at the location of the HVAC system. As such, the system provides a scalable optimal start/stop methodology that provides user comfort at the beginning and end of a building occupancy time, while increasing HVAC equipment efficiency.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments have been described, it is to be understood that aspects of the disclosure may include only some of the described embodiments. Accordingly, the disclosure is not to be seen as limited by the foregoing description, but is only limited by the scope of the appended claims.

What is claimed is:

1. A control system for an HVAC system having at least one HVAC component, the control system comprising:
    a controller having a processor and a memory, the controller in signal communication with the at least one HVAC component, the controller configured to:
    determine a first setpoint and a first time associated with a beginning of a building occupancy period;
    determine a predicted weather condition for outside air at a location of the HVAC system;
    predict a first indoor air condition based on the determined first setpoint and time and the predicted weather condition using a backward prediction from the first setpoint and the first time; and start the at least one HVAC component when an actual room air condition approaches the first predicted indoor air condition.

2. The control system of claim 1, wherein the first setpoint is one or more conditions of air supplied to a zone.

3. The control system of claim 2, wherein the one or more conditions includes at least one of a temperature, a humidity, and a CO2 level of the air supplied to the zone.

4. The control system of claim 2, wherein the one or more conditions includes a temperature, a humidity, and a CO2 level of the air supplied to the zone.

5. The control system of claim 1, wherein the controller is further configured to:
    determine a second setpoint and a second time associated with an end of the building occupancy period;
    predict a second indoor air condition based on the determined second setpoint and time and the predicted weather condition; and
    shutdown the at least one HVAC component when the actual room air condition approaches the predicted second indoor air condition.

6. The control system of claim 1, wherein the at least one HVAC component comprises a capacity generation plant, an air handling unit, and at least one terminal unit.

7. An HVAC system comprising:
    at least one HVAC component;
    a controller having a processor and a memory, the controller in signal communication with the at least one HVAC component, the controller configured to:
        determine a first setpoint and a first time associated with a beginning of a building occupancy period;
        determine a predicted weather condition for outside air at a location of the HVAC system;
        predict a first indoor air condition based on the determined first setpoint and time and the predicted weather condition using a backward prediction from the first setpoint and the first time; and
        start the at least one HVAC component when an actual room air condition approaches the first predicted indoor air condition.

8. The HVAC system of claim 7, wherein the controller is configured to update the operational setpoints at predetermined time intervals.

9. The HVAC system of claim 7, wherein the first setpoint is one or more conditions of air supplied to a zone.

10. The HVAC system of claim 9, wherein the one or more conditions includes at least one of a temperature, a humidity, and a CO2 level of the air supplied to the zone.

11. The HVAC system of claim 9, wherein the one or more conditions includes a temperature, a humidity, and a CO2 level of the air supplied to the zone.

12. The HVAC system of claim 7, wherein the controller is further configured to:
    determine a second setpoint and a second time associated with an end of the building occupancy period;
    predict a second indoor air condition based on the determined second setpoint and time and the predicted weather condition; and
    shutdown the at least one HVAC component when the actual room air condition approaches the predicted second indoor air condition.

13. The HVAC system of claim 7, wherein the at least one HVAC component comprises a capacity generation plant, an air handling unit, and at least one terminal unit.

14. A method of controlling an HVAC system having at least one HVAC component, and a controller in signal communication with the at least one HVAC component, the method comprising:
    determining a first setpoint and a first time associated with a beginning of a building occupancy period;
    determining a predicted weather condition for outside air at a location of the HVAC system;
    predicting a first indoor air condition based on the determined first setpoint and time and the predicted weather condition using a backward prediction from the first setpoint and the first time; and
    starting the at least one HVAC component when an actual room air condition approaches the first predicted indoor air condition.

15. The method of claim 14, wherein the first setpoint is one or more conditions of air supplied to a zone.

16. The method of claim 15, wherein the one or more conditions includes at least one of a temperature, a humidity, and a CO2 level of the air supplied to the zone.

17. The method of claim 15, wherein the one or more conditions includes a temperature, a humidity, and a CO2 level of the air supplied to the zone.

18. The method of claim 14, further comprising:
    determining a second setpoint and a second time associated with an end of the building occupancy period;
    predicting a second indoor air condition based on the determined second setpoint and time and the predicted weather condition; and
    shutting down the at least one HVAC component when the actual room air condition approaches the predicted second indoor air condition.

19. The method of claim 14, wherein the at least one HVAC component comprises a capacity generation plant, an air handling unit, and at least one terminal unit.

* * * * *